United States Patent
Locheron et al.

(10) Patent No.: US 12,050,154 B2
(45) Date of Patent: Jul. 30, 2024

(54) SYSTEM AND METHOD FOR AUTOMATICALLY DETECTING LEAK NOISE IN AN AIRCRAFT

(71) Applicants: Airbus Operations SAS, Toulouse (FR); Airbus SAS, Blagnac (FR)

(72) Inventors: Marc Locheron, Toulouse (FR); Stéphane Lebru, Leguevin (FR)

(73) Assignees: Airbus Operations SAS, Toulouse (FR); Airbus SAS, Blagnac (FR)

( * ) Notice: Subject to any disclaimer, the term of this patent is extended or adjusted under 35 U.S.C. 154(b) by 1280 days.

(21) Appl. No.: 16/199,615

(22) Filed: Nov. 26, 2018

(65) Prior Publication Data

US 2019/0162624 A1 May 30, 2019

(30) Foreign Application Priority Data

Nov. 30, 2017 (FR) .................................. 1761424

(51) Int. Cl.
*G01M 3/00* (2006.01)
*B64D 13/06* (2006.01)
(Continued)

(52) U.S. Cl.
CPC ............. *G01M 3/007* (2013.01); *B64D 47/00* (2013.01); *B64F 5/60* (2017.01); *G01F 23/296* (2013.01);
(Continued)

(58) Field of Classification Search
CPC ...... G01M 3/007; G01M 3/24; G01M 3/3263; B64D 47/00; B64D 2013/0618; B64F 5/60; G01F 23/296
See application file for complete search history.

(56) References Cited

U.S. PATENT DOCUMENTS 3,004,303 A * 10/1961 Wilmer ..................... B64C 1/14
49/249
5,386,717 A * 2/1995 Toda ..................... G01M 3/202
73/40.7
(Continued)

FOREIGN PATENT DOCUMENTS

CN 205669677 U * 11/2016
EP 0498434 B1 * 6/1992
(Continued)

OTHER PUBLICATIONS

French Search Report; priority document.

*Primary Examiner* — Donald J Wallace
*Assistant Examiner* — Jalal C Coduroglu
(74) *Attorney, Agent, or Firm* — Greer, Burns & Crain, Ltd.

(57) ABSTRACT

A method and a system for detecting leak noise in an aircraft, making it possible to perform ground tests in complete safety and over an entire cabin pressurization range, thus avoiding having to resort to a plurality of in-flight tests. The system includes: at least one acquisition device configured to be installed in at least one area of interest of the aircraft, the acquisition device being configured to acquire data in relation to current noise in the area of interest and data in relation to a current pressure gradient between the cabin of the aircraft and the outside, and a monitoring device configured to control the acquisition of the data by the at least one acquisition device and to receive the acquisition data in order to detect any leak noise in the at least one area of interest.

11 Claims, 5 Drawing Sheets

(51) Int. Cl.
  *B64D 47/00* (2006.01)
  *B64F 5/60* (2017.01)
  *G01F 23/296* (2022.01)
  *G01M 3/24* (2006.01)
  *G01M 3/32* (2006.01)

(52) U.S. Cl.
  CPC ............ *G01M 3/24* (2013.01); *G01M 3/3263* (2013.01); *B64D 2013/0618* (2013.01)

(56) References Cited

U.S. PATENT DOCUMENTS

| | | | |
|---|---|---|---|
| 5,404,747 A | | 4/1995 | Johnston et al. |
| 5,416,724 A | * | 5/1995 | Savic ................ G01M 3/24 |
| | | | 702/54 |
| 5,675,506 A | * | 10/1997 | Savic ................ F17D 5/06 |
| | | | 73/592 |
| 6,020,832 A | * | 2/2000 | Jensen ................ G01S 13/935 |
| | | | 701/4 |
| 7,739,899 B1 | * | 6/2010 | Holland ................ G01M 3/24 |
| | | | 73/52 |
| 8,502,700 B2 | | 8/2013 | Uhlendorf et al. |
| 9,428,088 B1 | * | 8/2016 | Rajasingham ........... B60N 2/68 |
| 10,108,194 B1 | * | 10/2018 | Russell ................ G05D 1/0212 |
| 2002/0112527 A1 | | 8/2002 | Nadin |
| 2004/0130442 A1 | * | 7/2004 | Breed ................ G02B 27/01 |
| | | | 340/449 |
| 2004/0167734 A1 | * | 8/2004 | Ramillon ................ G01H 1/06 |
| | | | 702/76 |
| 2005/0273218 A1 | * | 12/2005 | Breed ................ G07C 5/085 |
| | | | 701/2 |
| 2006/0025897 A1 | * | 2/2006 | Shostak ................ G08G 1/017 |
| | | | 701/1 |
| 2010/0072334 A1 | * | 3/2010 | Le Gette ................ F16M 11/10 |
| | | | 29/428 |
| 2010/0191506 A1 | * | 7/2010 | Chyba ................ G01J 3/02 |
| | | | 702/182 |
| 2011/0234426 A1 | * | 9/2011 | Uhlendorf ................ B64F 5/60 |
| | | | 73/40 |
| 2012/0020511 A1 | * | 1/2012 | Power ................ H04R 1/086 |
| | | | 381/352 |
| 2012/0093339 A1 | * | 4/2012 | Wu ................ G01S 3/8083 |
| | | | 381/92 |
| 2013/0062468 A1 | * | 3/2013 | Yokoi ................ B60J 10/16 |
| | | | 277/637 |
| 2013/0134291 A1 | * | 5/2013 | Le Gette ................ F16M 13/04 |
| | | | 248/688 |
| 2014/0165731 A1 | * | 6/2014 | Linford ................ G05B 23/0283 |
| | | | 702/183 |
| 2016/0061977 A1 | * | 3/2016 | Turnbull ................ G01M 3/24 |
| | | | 702/54 |
| 2016/0091387 A1 | | 3/2016 | Muehleisen et al. |
| 2016/0107768 A1 | * | 4/2016 | Nicks ................ G05B 23/0283 |
| | | | 702/183 |
| 2016/0356665 A1 | * | 12/2016 | Felemban ........... G01M 3/2807 |
| 2016/0356666 A1 | * | 12/2016 | Bilal ................ G01M 3/2807 |
| 2019/0259370 A1 | * | 8/2019 | Yamaguchi ....... G10K 11/17857 |

FOREIGN PATENT DOCUMENTS

| | | | | |
|---|---|---|---|---|
| EP | 1336827 A1 | * | 8/2003 | ............... G01H 1/06 |
| FR | 2573723 A1 | * | 11/1984 | ............... B64F 1/305 |
| GB | 2331152 A | | 5/1999 | |
| KR | 20030010872 A | * | 7/2001 | ......... H04Q 2209/10 |
| KR | 20030010872 A | * | 2/2003 | ......... G01H 1/06 |
| WO | 0201175 A1 | | 1/2002 | |
| WO | 2009068057 A1 | | 6/2009 | |
| WO | WO-2009068057 A1 | * | 6/2009 | ............... B64F 5/60 |
| WO | WO-2017183637 A1 | * | 10/2017 | ............... B64C 39/02 |

* cited by examiner

SYSTEM AND METHOD FOR AUTOMATICALLY DETECTING LEAK NOISE IN AN AIRCRAFT

CROSS-REFERENCES TO RELATED APPLICATIONS

This application claims the benefit of the French patent application No. 1761424 filed on Nov. 30, 2017, the entire disclosures of which are incorporated herein by way of reference.

BACKGROUND OF THE INVENTION

The present invention pertains to the field of leak noise tests on an aircraft, and relates more particularly to leak noise detection in areas of interest of the aircraft.

Before being shipped, an aircraft is subjected to a whole series of ground and in-flight tests and trials, including leak noise tests. Specifically, at a certain stage of development, pressurization tests are performed on the aircraft on the ground, during which tests compressors inject air into the aircraft in order to increase the cabin pressure. Increasing the pressure creates a pressure gradient between the cabin and the outside, modelling that to which the aircraft is subjected in flight. The maximum gradient that is reached is equal to the maximum gradient obtained in flight plus a certain margin of the order of thirty-three percent. Once the pressure has stabilized, operators approach the aircraft in order to manually inspect it from the outside so as to detect leak noise, primarily at the door frames.

However, for operator safety reasons, the pressurization of the aircraft is not able to be increased beyond a certain threshold. Due to this, during these tests, the pressure gradient is representative of the climbing phase of the aircraft, but not of the cruising phase where the gradient is much higher. Thus, ground tests are not representative of all of the phases of the flight, and therefore do not take into account the evolution of the leak noise depending on the various pressure gradients. Furthermore, ground tests are not easy and depend on weather conditions during the trials. Moreover, manual tests from outside the aircraft may generate non-noisy leak detections that are not particularly relevant with regard to the acoustic comfort of the cabin.

Therefore, additional leak noise detection tests are performed in flight. During these in-flight tests, airmen pass through the cabin and record any abnormal noise, including leak noise. Once on the ground, these recordings are scrutinized and analyzed so as to detect any anomaly. However, these in-flight trials are very expensive and require a lot of time, which may affect the shipping deadlines for the aircraft.

The aim of the present invention is to propose a system for detecting leak noise in an aircraft that rectifies the above-mentioned drawbacks and allows exhaustive and accurate detection of leak noise, while at the same time avoiding having to resort to a plurality of in-flight tests.

SUMMARY OF THE INVENTION

The present invention targets a system for detecting leak noise in an aircraft, including:
at least one acquisition device intended to be installed in at least one area of interest of the aircraft, the acquisition device being configured to acquire data in relation to current noise in the area of interest and data in relation to a current pressure gradient from among a plurality of operational pressure gradients representative of the various phases of the flight, between the cabin of the aircraft and the outside, and
a monitoring device configured to control the acquisition of the data by the at least one acquisition device and to receive the acquisition data in order to detect any leak noise in the at least one area of interest.

This system makes it possible to perform ground tests in complete safety and over an entire cabin pressurization range by attaching the acquisition device(s) to the area(s) of interest and by controlling the acquisition of the data from the monitoring device from outside the aircraft. It will be noted that the cabin pressurization range is representative of the various phases of the flight: climbing, descending and cruising, corresponding to pressure gradients of around 0 to 9 psi. These tests may be performed very early in the life cycle of the aircraft, therefore avoiding resorting to repetitive in-flight tests. Thus, defects are able to be repaired very early in the life of the aircraft, thereby satisfying shipping periods and deadlines. In addition, this system makes it possible to detect relevant leaks that make noise, thus avoiding false detections. Furthermore, the same detection system is also able to be used in flight to create a map of the noise in the whole cabin.

Advantageously, the at least one acquisition device is connected to the monitoring device through a wireless network.

The wireless links allow quick and simple installation and synchronization of the detection system and a reliable real-time transfer of data, while at the same time avoiding using very long cables.

Advantageously, the monitoring device is configured to:
associate the acquisition data in relation to the current noise with those in relation to the current pressure gradient representative of a cabin pressurization level,
perform spectral analysis of the acquisition data in relation to the current noise, thus forming acquisition spectral data,
compare the acquisition spectral data with reference spectral data for one and the same pressure gradient, and
detect, on the basis of the comparison, any leak noise in the at least one area of interest in line with at least one pressure gradient value.

The system makes it possible to automatically process and analyze the data and to determine, autonomously and in real time, anomalies linked to leak noise.

Advantageously, the monitoring device is configured to automatically trigger the recording of noise by the at least one acquisition device at predetermined pressure gradient values.

This allows autonomous recording at relevant pressure gradients without any intervention.

Advantageously, the system includes a set of noise acquisition devices that are intended to be installed in a corresponding set of areas of interest of the aircraft, each acquisition device includes a microcomputer and at least one microphone, at least one of the acquisition devices is equipped with a pressure sensor for measuring the pressure in the cabin of the aircraft, the acquisition device equipped with the pressure sensor being configured to determine each current pressure gradient by comparing the current pressure with an initial pressure measured before the pressurization of the cabin.

This makes it possible to detect leak noise simultaneously in a plurality of areas of interest easily and quickly, and makes it possible to determine the pressure gradients accurately, easily and quickly.

Advantageously, each acquisition device includes a set of microphones that are intended to be arranged at various supervision locations of the area of interest, and the monitoring device is configured to locate the location exhibiting an anomaly on the basis of the noise acquisition data coming from the various microphones.

This makes it possible to facilitate maintenance by accurately locating the region exhibiting an anomaly.

Advantageously, the monitoring device includes a graphical interface configured to indicate the configuration of the installation of the acquisition devices and microphones in the various areas of interest of the aircraft, as well as the connection to the wireless network and the operability of each of the acquisition devices and of each of the microphones.

This makes it possible to check the correct connection and the correct operation of the various elements right throughout the test.

By way of example, each area of interest of the aircraft corresponds to any area from among the following areas: passenger door, cargo door, sliding window in the cockpit, and any area having an element that passes through a pressurized section of the aircraft (for example water evacuation drains).

Advantageously, the system includes a support having articulated arms, the support being intended to be attached to the area of interest of the aircraft, and each articulated arm being intended to support a microphone.

This makes it possible to attach the acquisition devices quickly and in various configurations.

The invention also targets a protective case (of PELI type) including cells that are designed to receive the monitoring device, a set of acquisition devices, and a set of microphones of the monitoring system in accordance with any one of the preceding features, and furthermore includes an electric power supply system designed to charge the monitoring device and the acquisition devices.

This makes it possible to have a compact detection system that is well protected and easy to transport and to recharge.

The invention also targets a method for detecting leak noise in an aircraft, including the following steps:
  acquiring data in relation to current noise in at least one area of interest of the aircraft and data in relation to a current pressure gradient from among a plurality of operational pressure gradients representative of the various phases of the flight, between the cabin of the aircraft and the outside, and
  controlling the acquisition of the data and receiving the acquisition data, making it possible to detect any leak noise in the at least one area of interest.
Advantageously, the method includes the following steps:
  installing at least one noise acquisition device in at least one area of interest in the cabin of the aircraft, the acquisition device including a set of microphones arranged at various supervision locations of the corresponding area of interest,
  pressurizing the cabin of the aircraft in accordance with a series of pressure gradients,
  controlling the at least one acquisition device with a monitoring device from outside the aircraft, the monitoring device being connected to the acquisition device via a network, and
  analyzing the acquisition data using the acquisition device or the monitoring device in order to detect any leak noise in the areas of interest in line with various pressure gradient values.

Advantageously, the analysis of the acquisition data includes correlating the acquisition data with reference data, comprising the following steps:
  associating the acquisition data in relation to the current noise with those in relation to the current pressure gradient representative of a cabin pressurization level,
  performing spectral analysis of the acquisition data in relation to the current noise, thus forming acquisition spectral data,
  comparing the acquisition spectral data with reference spectral data, and
  detecting, on the basis of the comparison, any leak noise in the at least one area of interest in line with at least one pressure gradient value.

BRIEF DESCRIPTION OF THE DRAWINGS

Other particular features and advantages of the system and of the method according to the invention will become better apparent upon reading the following description, given by way of nonlimiting indication, with reference to the appended drawings, in which.

DETAILED DESCRIPTION OF THE PREFERRED EMBODIMENTS

The principle of the invention is, in particular, that of automating the detection of leak noise in an aircraft, allowing tests to be performed on the ground and at a plurality of operational pressure gradients.

Figure 1:
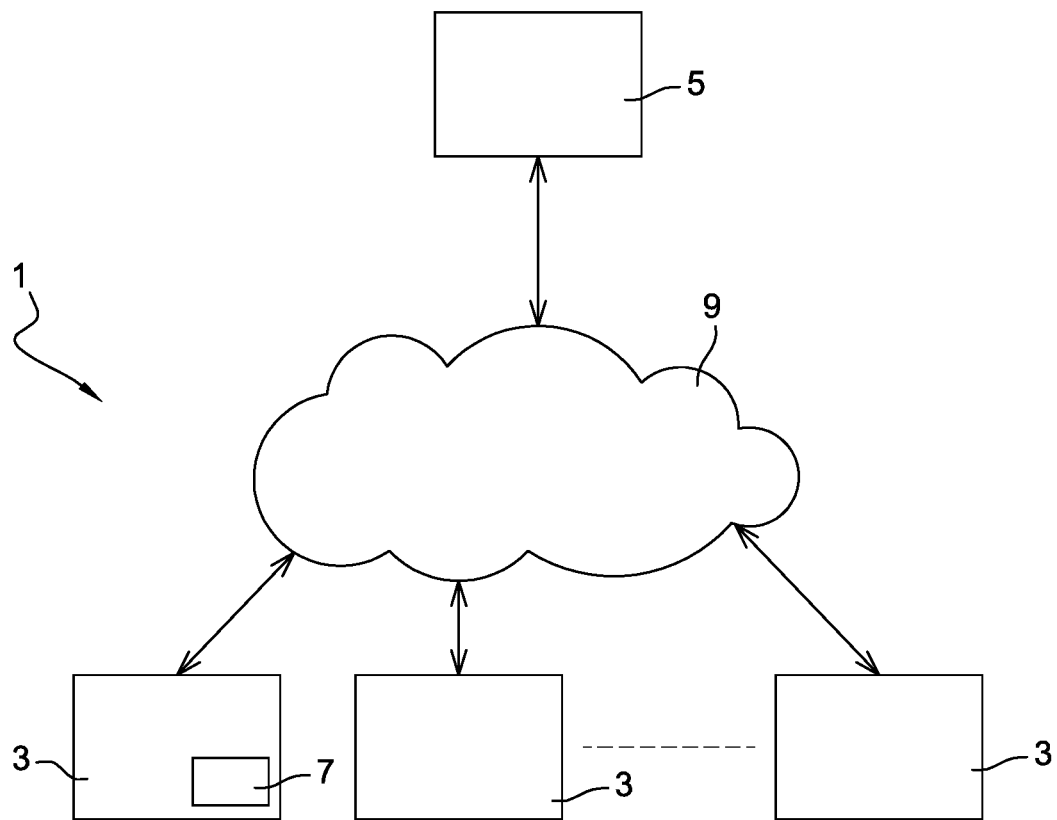
FIG. 1 schematically illustrates a system for detecting leak noise in an aircraft, according to one embodiment of the invention.

FIG. 1 schematically illustrates a system for detecting leak noise in an aircraft, according to the invention.

According to the invention, the detection system 1 includes at least one acquisition device 3 and a monitoring device 5. The acquisition device(s) 3 is (are) configured to measure noise, and at least one of the acquisition devices 3 is furthermore equipped with a pressure sensor 7.

More particularly, each acquisition device 3 is intended to be installed in an area of interest (for example on a door) of the aircraft in order to acquire data in relation to current noise in the area of interest. The acquisition device 3 equipped with a pressure sensor 7 is furthermore configured to acquire data in relation to a current pressure gradient between the cabin of the aircraft and the outside.

The monitoring device 5 is configured to control the acquisition of the data by the acquisition device(s) 3 and to receive the acquisition data in order to detect any leak noise in the area(s) of interest of the aircraft. The detection system thus makes it possible not only to record noise, but also to process the noise autonomously with respect to the pressure gradients. Furthermore, the acquisition device(s) 3 is (are) advantageously connected to the monitoring device 5 through a wireless network 9.

Figure 2:
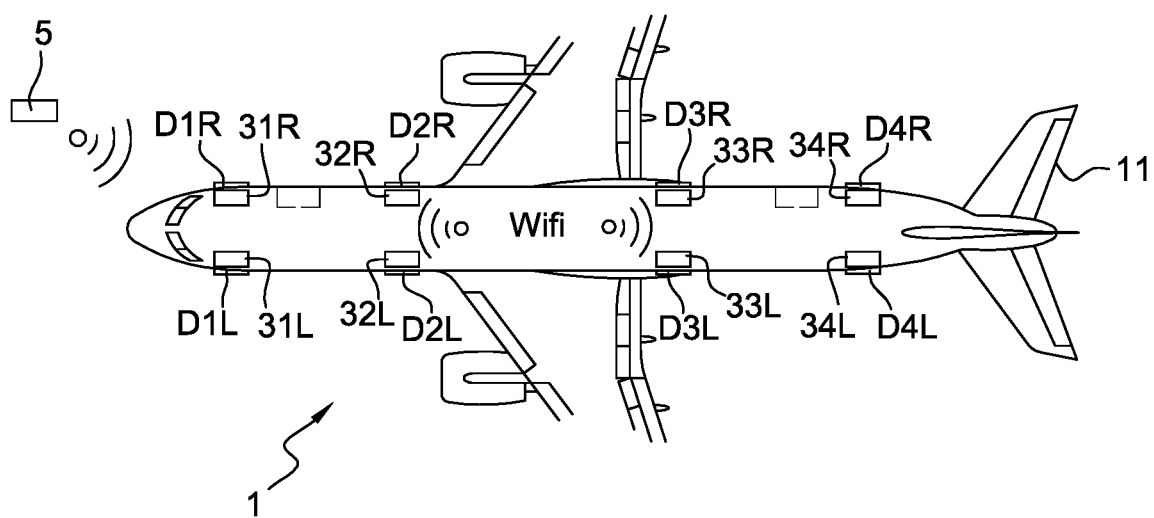
FIG. 2 schematically illustrates a system for detecting leak noise in an aircraft, according to one preferred embodiment of the invention.

FIG. 2 schematically illustrates a system for detecting leak noise in an aircraft, according to one embodiment of the invention.

According to this embodiment, the detection system 1 includes a monitoring device 5 and a plurality of acquisition devices 31R-34R and 31L-34L. In this example, the detection system 1 includes eight acquisition devices 31R-34R and 31L-34L that are intended to be fitted to the eight doors D1R-D4R and D1L-D4L of the aircraft 11. Of course, the number of acquisition devices 3 may be as desired, and likewise the area of interest is not limited to a passenger or crew door, but may also be a sliding window in the cockpit, a cargo door, and any area having an element that passes through the pressurized section of the aircraft (for example water evacuation drains).

Figure 3:
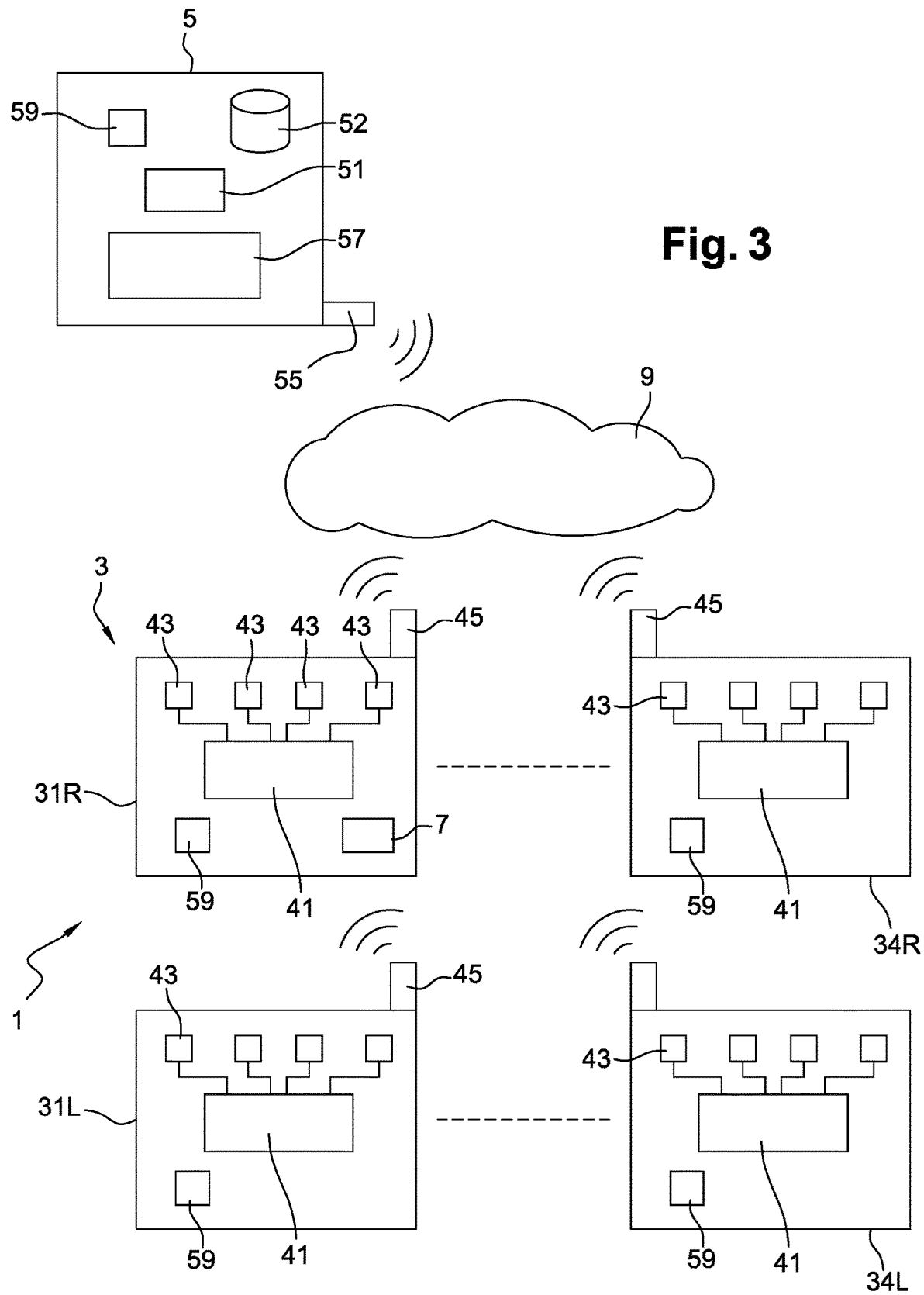
FIG. 3 schematically illustrates the leak noise detection system of FIG. 2 in more detail.

FIG. 3 schematically illustrates the leak noise detection system of FIG. 2 but in more detail.

Each acquisition device 31R, . . . , 34L includes a microcomputer 41 (for example the size of a credit card) and one or more microphone(s) 43. Advantageously, the acquisition device 3 includes a plurality of microphones 43 that may be arranged at various supervision locations of the area of interest. For example, in the case of a door, a microphone 43 may be situated at each corner of the door. Each microphone 43 is, for example, configured to record noise up to around 135 dB. Furthermore, each acquisition device 3 is equipped with an integrated Wi-Fi antenna 45 that supports, for example, a frequency of a few GHz designed for peer-to-peer connections from any position inside the cabin and to a wide area around the aircraft 11. Moreover, at least one of the acquisition devices 31R is equipped with a pressure sensor 7 for measuring the pressure in the cabin of the aircraft 11.

The monitoring device 5 includes a master microcomputer 51 (for example the size of a credit card) equipped with a Wi-Fi antenna 55 and configured to control the acquisition devices 3 through a wireless network 9. Furthermore, the monitoring device 5 includes a graphical interface 57 designed to indicate the configuration of the installation of the acquisition devices 3 and microphones 43 in the various areas of interest D1R-D4R and D1L-D4L of the aircraft 11, as well as the connection to the wireless network 9 and the state of operability of each of the acquisition devices 3 and of each of the microphones 43. The graphical interface 57 also allows the user to control the detection system by triggering actions and by providing information relating to the aircraft or the detection method.

The monitoring device 5 also includes a memory 52 that is able to be used for example to store data relating to the aircraft. Furthermore, each of the acquisition and monitoring devices is also equipped with a power supply battery 59.

Figure 4:
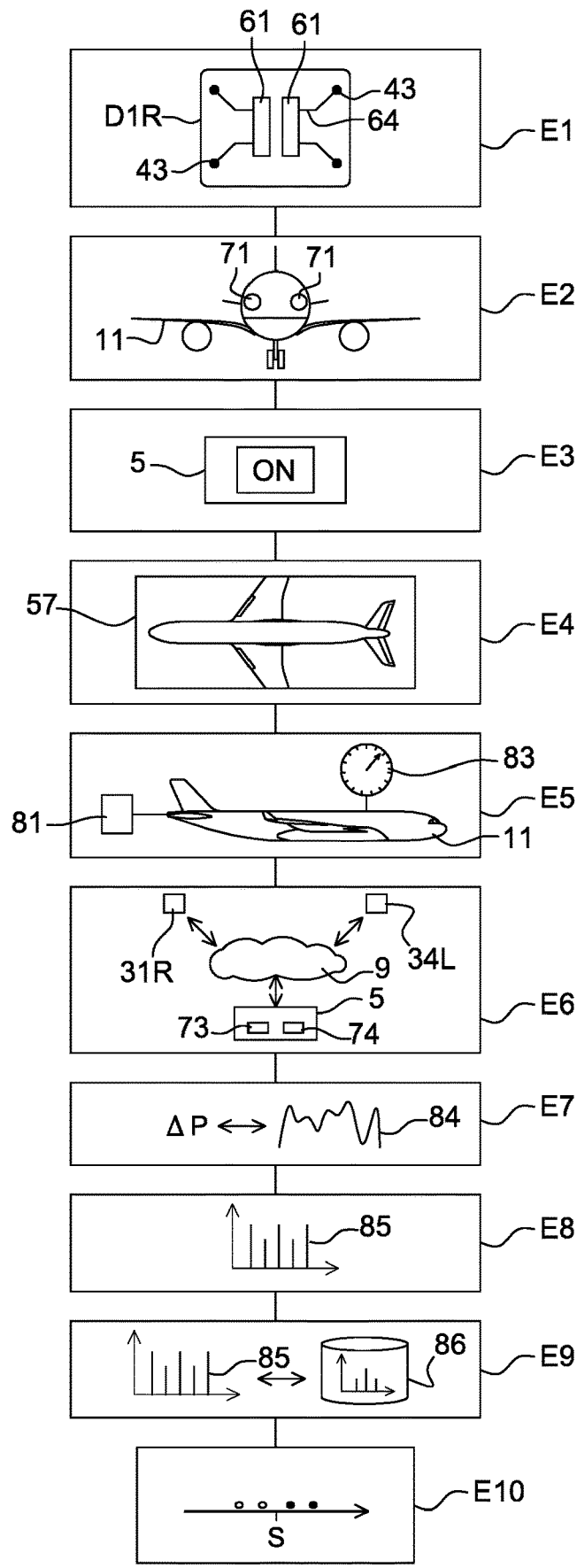
FIG. 4 schematically illustrates a method for detecting leak noise in an aircraft with reference to FIGS. 2 and 3, according to one preferred embodiment of the invention.

FIG. 4 schematically illustrates a method for detecting leak noise in an aircraft with reference to FIGS. 2 and 3, according to one embodiment of the invention.

This method relates to the detection of leak noise in an aircraft on the ground and includes steps of installing the detection system, of pressurizing the aircraft, and of processing and analyzing data in order to detect leak anomalies.

Steps E1 and E2 relate to the installation of the detection system, during which a plurality of acquisition devices are positioned inside the aircraft at the corresponding areas of interest.

More particularly, in step E1, one (or more) support(s) having articulated arms is (are) attached to each door D1R-D4R and D1L-D4L of the aircraft 11.

Figure 5:
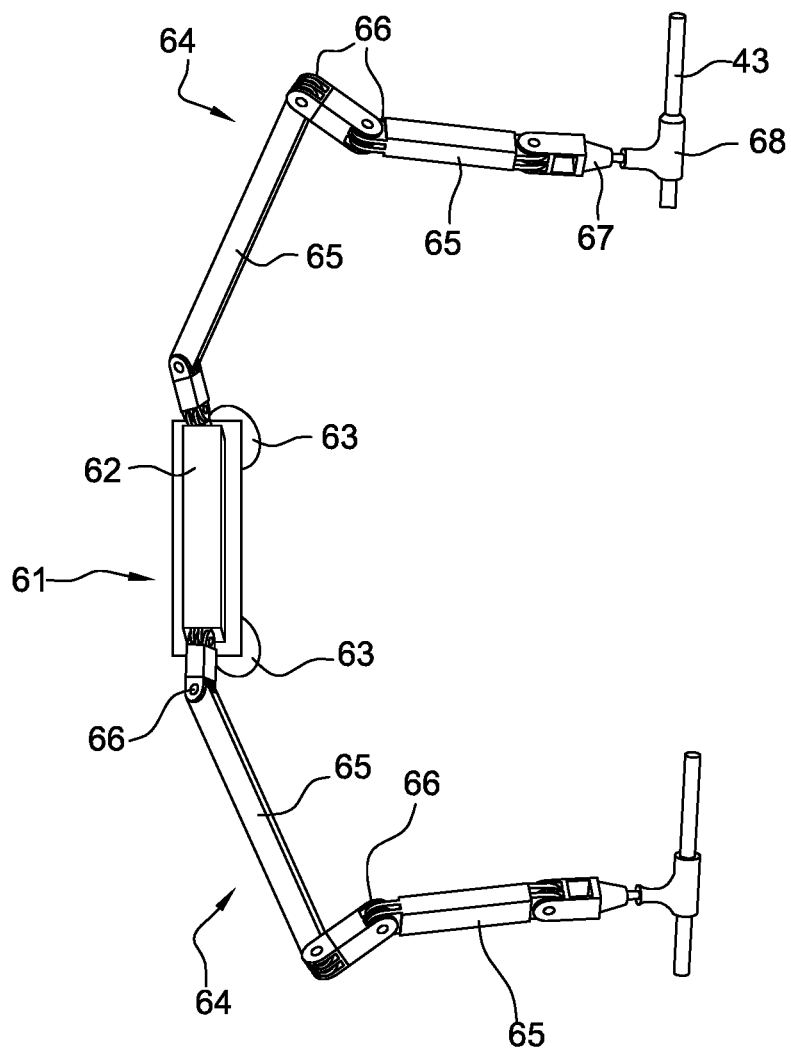
FIG. 5 schematically illustrates a support for the detection system, according to one preferred embodiment of the invention.

FIG. 5 schematically illustrates a support for the detection system, according to one embodiment of the invention.

The support 61 includes a base 62 equipped with attachment means 63 and a plurality of articulated arms 64. Each articulated arm 64 is formed of a plurality of segments 65 that are linked linearly to one another by pivot connections 66 or ball-joint connections 67. The connections may be blocked by screws, nuts or other blocking means. One end of each articulated arm 64 is attached to the base 62 by a pivot connection 66, and the other end is linked, by a ball-joint connection 67, to a support element or clamping element 68 designed to support and hold a microphone 43 with all degrees of freedom. The example of FIG. 5 illustrates a support 61 including two articulated arms 64 thus able to support two microphones 43, and the attachment means 63 include two suction cups that are designed to adhere strongly to a solid surface, such as that of certain planes of an aircraft 11.

Thus, two supports 61 are attached to each door D1R-D4R and D1L-D4L of the aircraft 11, and each of the four articulated arms 64 bears a microphone 43. The arms 64 are articulated such that each microphone 43 supervises a region around a corresponding corner of the door D1R-D4R and D1L-D4L, such that the whole door is completely supervised by the four microphones 43, which are connected to one and the same microcomputer 41.

In step E2, Wi-Fi access points 71 (for example two access points), using a dynamic host configuration protocol (DHCP), are installed on the aircraft 11 in order to provide for wireless connections using an automatic configuration of the IP parameters between the monitoring device 5 positioned outside the aircraft 11 and the various acquisition devices 3 situated inside the aircraft 11. Dynamic IP addresses are thus automatically assigned to the various acquisition devices 3, whereas the monitoring device 5 may have a static IP address.

Step E3 relates to the starting up of the detection system 1, comprising initializing and setting parameters of the various acquisition and monitoring devices 3 and 5, respectively, and of the Wi-Fi access points 71.

In step E4, the graphical interface 57 of the monitoring device 5 indicates the layout of the installation of the acquisition devices 3 and of the microphones 43 in the various areas of interest D1R-D4R and D1L-D4L of the aircraft 11. The graphical interface 57 also indicates the connection to the wireless network 9 and the state of operability of each of the acquisition devices 3 and of each of the microphones 43.

Specifically, the graphical interface 57 displays all of the data relating to the connections of the various elements of the detection system, and data relating to the aircraft. Specifically, the memory 52 of the monitoring device 5 allows the user to specify data in relation to the aircraft 11 being tested.

Figure 6:
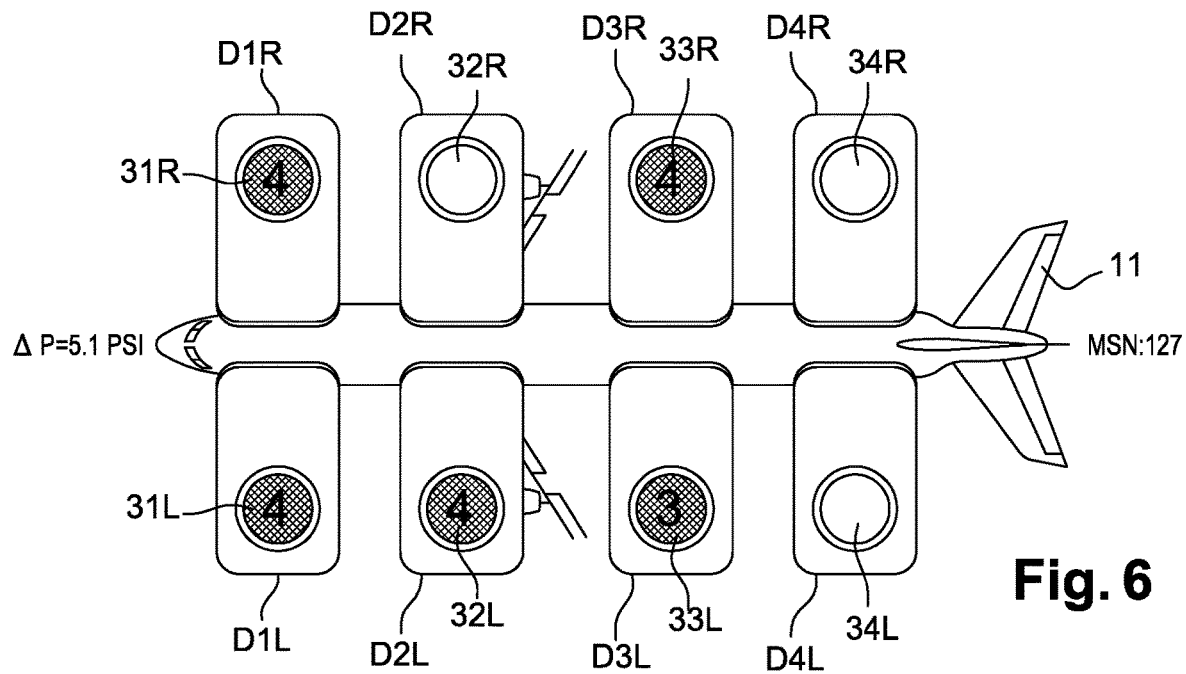
FIG. 6 illustrates graphics displayed on the interface of the monitoring device, giving a general configuration of the connections, according to one embodiment of the invention.

FIG. 6 illustrates graphics displayed on the interface of the monitoring device, giving a general configuration of the connections, according to one embodiment of the invention.

According to this example, the interface 57 of the monitoring device 5 includes a touchscreen that displays a layout of the aircraft 11 being inspected and its identity (e.g., MSN 127), and the selected areas of interest. In this example, the areas of interest correspond to the right-hand doors D1R-D4R and left-hand doors D1L-D4L of the aircraft 11. Each acquisition device 31R-34R and 31L-34L is represented by a circular graphical icon displayed on the location (i.e., the door D1R-D4R, D1L-D4L) where it is installed. The color of the circular icon indicates the state of connection of the acquisition device 31R-34R and 31L-34L, and a number indicates the number of microphones 43 that are operational in this area. The pressure inside the aircraft 11 and the pressure gradient are also displayed (e.g., ΔP=5.1 PSI), with the knowledge that the pressure gradient is zero to begin with. Furthermore, the interface 57 includes buttons 73, 74 that command the automatic and manual modes, respectively (see step E6), and a button 75 in relation to the setting of the parameters and a startup button 76.

According to this example, the acquisition devices 31R, 33R, 31L and 32L situated on the first and third right-hand doors D1R, D3R and on the first and second left-hand doors D1L and D2L, respectively, are connected, and their associated microphones are all detected as being operational (indicated here by the number 4). The device 33L situated on the third left-hand door D3L is connected, and only three of its microphones are operational. By contrast, the devices 32R, 34R and 34L situated on the second and fourth right-hand doors D2R, D4R and on the fourth left-hand door D4L are not connected. It will be noted that, by clicking on an icon, the user may get more information regarding the corresponding acquisition device.

In step E5, the cabin of the aircraft is pressurized in line with a plurality of pressure gradient levels that may reach around 700 mbar, thus modelling all of the phases of the flight. Specifically, the auxiliary power unit APU of the aircraft, or possibly a system of external compressors 81 of GPU (ground power unit) type, is used to inject air into the aircraft 11, thus increasing the pressure 83 in the cabin and thereby creating a pressure gradient that models that to which the aircraft 11 is subjected in flight.

In step E6, the acquisition devices 31R-34L are controlled from the outside via the monitoring device 5 through the wireless network 9 and from an area situated a sufficient safety distance away from the aircraft 11. The leak noise may be supervised and detected using a manual or automatic mode.

In manual mode 73, the user controls starting or stopping of the recording by the various acquisition devices 31R-34L. For example, by triggering the starting of the eight acquisition devices 31R-34R each equipped with four microphones 43 simultaneously, the user is able to recover "32" audio files allowing real-time noise detection on the monitoring device 5 via the wireless network 9.

In automatic mode 74, the monitoring device 5 transmits trigger signals (for example regularly) to the various acquisition devices 31R-34L in order to trigger starting of the recordings. By way of example, the trigger signals are transmitted every two minutes, and each trigger signal is designed to command the acquisition devices 31R-34L so as to perform an automatic recording for ten seconds. Moreover, each acquisition device 31R-34L, being equipped with a battery 59, is able to record the noise in relation to its area of interest, and may possibly process and analyze its recordings autonomously. Files containing the current recordings of each of the acquisition devices 31R-34L and the pressure gradients corresponding to the recordings, and possibly the analyses of these recordings, are automatically transmitted to the monitoring device 5. The latter stores the files received from the various acquisition devices 31R-34L in its memory 52.

As a variant, the monitoring device 5 is configured to automatically trigger the recording of noise by the acquisition devices 31R-34L at predetermined pressure gradient values, for example at 300 mbar, 350 mbar, 450 mbar, 500 mbar, 550 mbar, 600 mbar, 650 mbar, etc., representative of the flight phases at various altitudes. Specifically, the acquisition device 31R equipped with the pressure sensor 7 determines each current pressure gradient by comparing the current pressure with the initial pressure measured before pressurization of the cabin. Each pressure gradient value is transmitted to the monitoring device 5. The latter then sends a trigger signal to the acquisition devices 31R-34L in order to record the noise each time the pressure gradient reaches a relevant level pre-recorded in its memory 52.

In steps E7-E10, the monitoring device 5 is configured to process the data received from the various acquisition devices 31R-34L so as to detect leak noise. These steps make it possible to correlate the acquisition data with reference data.

More particularly, in step E7, the monitoring device 5 is configured to associate the acquisition data 84 in relation to the current noise with those in relation to the current pressure gradient ΔP representative of the cabin pressurization level.

In step E8, the monitoring device 5 is configured to perform spectral analysis of the acquisition data in relation to the current noise sensed by the microphones 43 of each of the acquisition devices 31R-34L, thus forming acquisition spectral data 85. Each spectrum may be calculated in a conventional fashion using digital signal processing, using for example the fast Fourier transform (FFT). We are interested for example in a certain frequency range between 4 kHz and 12 kHz, using a one-third-octave band metric.

More particularly, for each noise recording performed by each microphone 43, a static interruption time (not polluted by transient events) is determined. Next, an average value $SIL_{special}$ per one-third-octave band, centred for example on frequencies of 4 kHz, 8 kHz and 16 kHz, is calculated using the following formula:

$$SIL_{special} = \frac{Loctave_{4kHz} + Loctave_{8kHz} + Loctave_{16kHz}}{3}$$

In step E9, the monitoring device 5 is configured to compare the acquisition spectral data 85 with reference spectral data pre-recorded in a database 86 containing known recordings of leak noise emanating from areas analogous to the areas of interest (here the doors of the aircraft). More particularly, the average values $SIL_{special}$ are compared with reference average values $SIL_{ref}$ determined per one-third-octave band centred on one and the same frequency range from a learning database containing leak noise recordings that are known and obtained in the same contexts. In other words, the comparisons are performed for identical pressure gradient values and for identical supervision locations. For example, the average value $SIL_{special}$ obtained at a given pressure gradient by a microphone installed at an upper right-hand corner of a given door is compared with a reference average value $SIL_{ref}$ obtained at the same pressure gradient value and for the same location.

In step E10, the monitoring device 5 is configured to detect, on the basis of the comparison, any leak noise in each area of interest in line with each pressure gradient value. Specifically, if the deviation between the acquisition spectral data 85 and the reference spectral data 86 exceeds a predetermined threshold S, then the corresponding area of interest is considered to exhibit leak noise, and requires inspection and possibly repair.

Advantageously, certain types of repair will be correlated with certain types of leak defect having well-identified spectral features.

More particularly, the monitoring device 5 is configured to locate the location exhibiting an anomaly on the basis of the noise acquisition data coming from the various microphones 43. The anomaly is thus located accurately using the supervision location covered by the microphone 43 that has sensed the leak noise. This makes it possible to identify the defective door and, by detecting the deviation with respect to the threshold S for each microphone, it is possible to identify the defective area of the door more accurately. The results are reported directly in real time on the touchscreen 57 of the monitoring device 5.

It will be noted that, as a variant, steps E8-E10 relating to the spectral digital processing, the comparison of the acquisition spectral data with reference spectral data and the detection of leak noise, may be performed individually and automatically by each of the acquisition devices 31R-34L, and the analysis results are transmitted in real time to the monitoring device 5.

Advantageously, the various recordings and analyses are stored by the monitoring device 5 in fixed and/or removable storage means. These data may then be uploaded to a dedicated server in order to create statistics and in order to enrich the reference spectral data.

Advantageously, the detection system 1 is also able to be used in flight to create a map of the noise in the whole cabin. Specifically, once the system has been installed in the aircraft 11, it is enough for a single operator to map the whole cabin quickly and efficiently.

Figure 7:
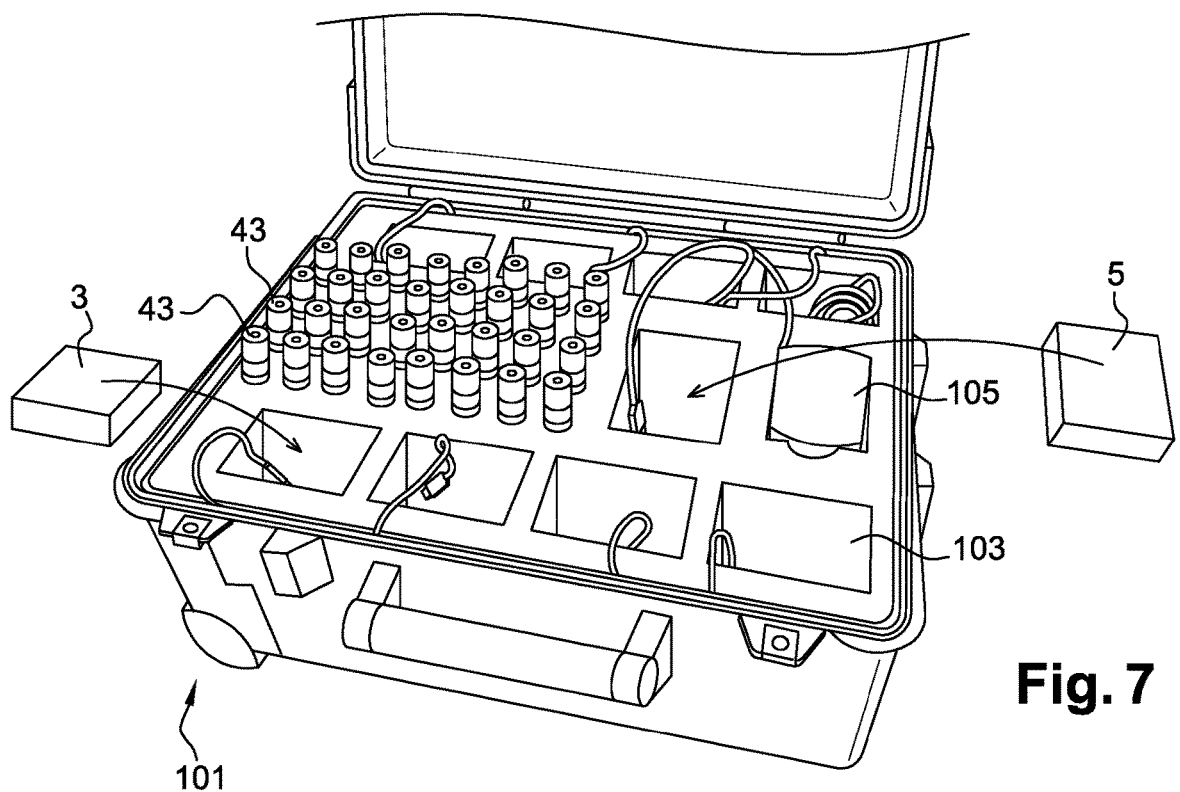
FIG. 7 illustrates a protective case designed to incorporate the detection system, according to one preferred embodiment of the invention.

FIG. 7 illustrates a protective case designed to accommodate the detection system therein, according to one preferred embodiment of the invention.

The protective case 101 is of PELI type, is easy to transport and includes storage cells or compartments 103 that are designed to receive the monitoring device 5, the acquisition devices 3 and the microphones 43 of the detection system 1. Specifically, each element of the detection system 1 is of a size not exceeding the size of a mobile telephone, thus making it possible to incorporate the whole detection system into the case 101 in a compact and secure fashion.

Furthermore, the case 101 includes an electric power supply system 105 designed to charge the monitoring device 5 and the various acquisition devices 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A detection system for detecting leak noise in an aircraft, including:
   a set of noise acquisition devices configured to be installed in a set of corresponding areas of interest of the aircraft, and wherein at least one of the acquisition devices is equipped with a pressure sensor for measuring a pressure in the cabin of the aircraft, said acquisition device equipped with the pressure sensor being configured to determine each current pressure gradient by comparing a current pressure with an initial pressure measured before a pressurization of the cabin,
   each acquisition device configured to acquire noise acquisition data in relation to current noise in said at least one area of interest and pressure gradient data in relation to the current pressure gradient from among a plurality of operational pressure gradients representative of various phases of a flight, between a cabin of the aircraft and an outside of the aircraft, each acquisition device including a microcomputer and a plurality of microphones,
   a monitoring device configured to control acquisition of the noise acquisition data and pressure gradient data by said at least one acquisition device and to receive said noise acquisition data and pressure gradient data in order to detect any leak noise in said at least one area of interest by processing the noise acquisition data from each acquisition device and comparing the processed noise acquisition data from each acquisition device to reference noise acquisition data, the reference noise acquisition data based on the current pressure in the cabin and the area of interest of the aircraft in which said acquisition device is installed, wherein said monitoring device is configured to automatically trigger a recording of noise by said at least one acquisition device at predetermined pressure gradient values; and,
   a support having articulated arms, said support being configured to be attached to the at least one area of interest of the aircraft, and each articulated arm being configured to support a microphone from an acquisition device independent of a position of another microphone from the respective acquisition device.

2. The detection system according to claim 1, wherein said at least one acquisition device is connected to said monitoring device through a wireless network.

3. The detection system according to claim 1, wherein the processing the noise acquisition data from each acquisition device and comparing the processed noise acquisition data from each acquisition device to reference noise acquisition data comprises:
   associate the acquisition data in relation to the current noise with those in relation to the current pressure gradient representative of a cabin pressurization level,
   perform spectral analysis of the acquisition data in relation to the current noise, thus forming acquisition spectral data,
   compare said acquisition spectral data with reference spectral data for one and the same pressure gradient, and
   detect, on a basis of said comparison, any leak noise in said at least one area of interest in line with the pressure gradient.

4. The detection system according to claim 1, wherein the monitoring device is configured to locate a location exhibiting an anomaly on a basis of the noise acquisition data coming from various ones of the set of microphones.

5. The detection system according to claim 1, wherein said at least one acquisition device is connected to said monitoring device through a wireless network, and wherein said monitoring device includes a graphical interface configured to indicate a configuration of an installation of the acquisition devices and microphones in the various at least one area of interest of the aircraft, as well as a connection to the wireless network and an operability of each of the acquisition devices and of each of the microphones.

6. The detection system according to claim 1, wherein each area of interest of the aircraft corresponds to any area from among the following areas: passenger door, cargo door, cockpit sliding window, and any area having an element that passes through a pressurized section of the aircraft.

7. A protective case including cells that are configured to receive the detection system according to claim 1, and further comprising an electric power supply system configured to charge the monitoring device and the set of acquisition devices.

8. A method for detecting leak noise in an aircraft, comprising the following steps:
   installing at least one noise acquisition device in at least one area of interest in a cabin of the aircraft, said at least one noise acquisition device including a plurality of microphones arranged at various supervision locations of the corresponding at least one area of interest,
   acquiring, with the at least one noise acquisition device, data in relation to current noise in the at least one area of interest of the aircraft and data in relation to a current pressure gradient from among a plurality of operational pressure gradients representative of various phases of a flight, between the cabin of the aircraft and an outside of the aircraft, the at least one noise acquisition device including a microcomputer and a plurality of microphones, wherein a support is attached to the at least one area of interest, the support comprising a plurality of articulated arms, each articulated supporting a microphone from an acquisition device independent of a position of another microphone from the respective acquisition device,
   controlling the acquisition of the data and receiving said acquisition data, making it possible to detect any leak noise in said at least one area of interest by processing the noise acquisition data from each acquisition device and comparing the processed noise acquisition data from each acquisition device to reference noise acquisition data, the reference noise acquisition data based on the current pressure in the cabin and the area of interest of the aircraft in which said acquisition device is installed, and,
   automatically triggering a recording of noise at predetermined pressure gradient values.

9. The method according to claim 8, further comprising the following steps:
   pressurizing the cabin of the aircraft in accordance with a series of pressure gradients,
   controlling said at least one noise acquisition device with a monitoring device from outside the aircraft, said monitoring device being connected to said noise acquisition device via a network, and
   analyzing the acquisition data using the acquisition device or the monitoring device to detect any leak noise in the at least one area of interest in line with various pressure gradient values.

10. The detection method according to claim 9, wherein the processing the noise acquisition data from each acquisition device and comparing the processed noise acquisition data from each acquisition device to reference noise acquisition data, comprises the following steps:
    associating the acquisition data in relation to a current noise with those data in relation to a current pressure gradient representative of a cabin pressurization level,
    performing spectral analysis of the acquisition data in relation to the current noise, thus forming acquisition spectral data,
    comparing said acquisition spectral data with reference spectral data, and
    detecting, based on said comparison, any leak noise in said at least one area of interest in line with at least one pressure gradient value.

11. A detection system for detecting leak noise in an aircraft comprising:
    at least one acquisition device configured to be installed in at least one area of interest of the aircraft, said acquisition device being configured to acquire noise acquisition data in relation to current noise in said at least one area of interest and pressure gradient data in relation to a current pressure gradient from among a plurality of operational pressure gradients representative of various phases of a flight, between a cabin of the aircraft and an outside of the aircraft, each acquisition device including a microcomputer and a plurality of microphones,
    a support having articulated arms, said support being configured to be attached to the at least one area of interest of the aircraft, and each articulated arm being configured to support a microphone from the at least one acquisition device independent of a position of another microphone form the respective acquisition device, and
    a monitoring device configured to control acquisition of the noise acquisition data and pressure gradient data by said at least one acquisition device and to receive said noise acquisition data and pressure gradient data and associate the acquisition data in relation to the current noise with those in relation to the current pressure gradient representative of a cabin pressurization level in order to detect any leak noise in said at least one area of interest by processing the noise acquisition data from each acquisition device and comparing the processed noise acquisition data from each acquisition device to reference noise acquisition data, the reference noise acquisition data based on the current pressure in the cabin and the area of interest of the aircraft in which said acquisition device is installed.

* * * * *